(12) United States Patent
Takemura

(10) Patent No.: US 9,228,605 B2
(45) Date of Patent: Jan. 5, 2016

(54) DEVICE CONNECTOR

(71) Applicant: Sumitomo Wiring Systems, Ltd., Yokkaichi (JP)

(72) Inventor: Akihiko Takemura, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 14/483,551

(22) Filed: Sep. 11, 2014

(65) Prior Publication Data

US 2015/0079855 A1 Mar. 19, 2015

(30) Foreign Application Priority Data

Sep. 18, 2013 (JP) ................................ 2013-192703

(51) Int. Cl.
*H01R 4/36* (2006.01)
*F16B 41/00* (2006.01)
*H01R 9/18* (2006.01)
*H01R 13/502* (2006.01)
*H01R 4/30* (2006.01)

(52) U.S. Cl.
CPC .............. *F16B 41/002* (2013.01); *H01R 4/301* (2013.01); *H01R 9/18* (2013.01); *H01R 13/502* (2013.01)

(58) Field of Classification Search
CPC .......... H01R 4/301; H01R 4/302; H01R 9/18; H01R 13/4364; H01R 13/4365; H01R 13/502; H01R 13/514; H01R 13/533; F16B 41/002

USPC .......... 439/813, 364, 709, 801, 246, 382, 595
See application file for complete search history.

(56) References Cited

U.S. PATENT DOCUMENTS

| | | | |
|---|---|---|---|
| 6,234,850 B1 * | 5/2001 | Pandit et al. .................. | 439/801 |
| 7,811,116 B2 * | 10/2010 | Sakakura et al. ............. | 439/364 |
| 8,251,756 B2 | 8/2012 | Matuoka | |
| 8,342,880 B2 * | 1/2013 | Kato et al. .................... | 439/595 |
| 8,587,959 B2 * | 11/2013 | Trussel et al. ................. | 361/809 |

* cited by examiner

*Primary Examiner* — Neil Abrams
*Assistant Examiner* — Travis Chambers
(74) *Attorney, Agent, or Firm* — Gerald E. Hespos; Michael J. Porco; Matthew T. Hespos

(57) ABSTRACT

A device connector has a detachment preventing plate (50) mounted on surfaces of terminal blocks (30) to prevent detachment of nuts (35) and has escaping holes (52) at positions corresponding to nut accommodating holes (33) for allowing the tips of bolts (8) to escape. Fixed rails (40) are formed on the surface of each terminal block (30) at opposite sides of the nut accommodating hole (33) and extend in a projecting direction of the terminal block (30). Moving rails (53) are provided on a facing surface of the detachment preventing plate (50) and fit slidably to the fixed rails (40). The detachment preventing plate (50) is pushed and attached to cover the surfaces of the terminal blocks (30) from projecting ends of the terminal blocks (30) while the moving rails (53) are slid along and guided by the fixed rails (40).

6 Claims, 12 Drawing Sheets

DEVICE CONNECTOR

BACKGROUND

1. Field of the Invention

The invention relates to a device connector in which terminal fittings are connected to mating terminals by bolt fastening.

2. Description of the Related Art

U.S. Pat. No. 8,251,756 discloses a device connector with a housing and a plurality of busbar-like terminal fittings mounted side by side in the housing. Each terminal fitting has a bolt insertion hole on a tip. The tips of the terminal fittings project on one surface of the housing and can be supported on terminal blocks. Square nuts are press-fit in a rotation prevented manner in nut accommodating holes on the respective terminal blocks. This housing is mounted on an outer surface of a case of a device and, the terminal blocks are arranged to project into the case through mounting holes on the case.

A busbar-like mating terminal fitting is placed on the upper surface of the terminal fitting supported on each terminal block, and also has a bolt insertion hole. The terminals are connected electrically by inserting a bolt through the bolt insertion holes and threadedly tightening the bolt into the nut.

Detachment of the nuts is prevented by press-fitting the nuts into the nut accommodating holes of the terminal blocks in this device connector.

The above-described device connector often is used in an environment where ambient temperature varies widely. Thus, the synthetic resin housing repeatedly expands and contracts with temperature changes, and the press-fit nuts may become loose. The loose nut may detach if the terminal fittings are separated for maintenance or the like and a subsequent fastening of the bolt becomes more time consuming.

The invention was completed based on the above situation and aims to enable a bolt fastening operation to be performed efficiently and accurately by preventing the detachment of nuts.

SUMMARY OF THE INVENTION

The invention is directed to a device connector with a housing and a plurality of terminal fittings mounted side by side in the housing. Each terminal fitting has a tip with a bolt insertion hole. A terminal block projects on a front of the housing and supports the tips of the terminal fittings. The housing is mounted on an outer surface of a case so that the terminal block and the tips of the terminal fittings supported thereon project through an opening in the case and into the interior of the case. Nut accommodating holes are open at positions on the terminal block corresponding to the bolt insertion holes of the respective terminal fittings and can accommodate nuts in a rotation prevented manner. The nuts can threadedly engage bolts that pass through the bolt insertion holes. A detachment preventing plate is mounted on an under surface of the terminal block to prevent detachment of the nuts and is formed with escaping holes at positions corresponding to the respective nut accommodating holes for allowing the tips of the bolts to escape. Fixed rails are formed on the under surface of the terminal block at opposite sides of each nut accommodating hole and extend in a projecting direction of the terminal block. Moving rails are provided on a facing surface of the detachment preventing plate and are fit slidably to the fixed rails. The detachment preventing plate is pushed and attached to cover the under surface of the terminal block from a projecting end of the terminal block while the moving rails are slid along and guided by the fixed rails.

The detachment preventing plate is pushed while the moving rails are fit to and slid along the fixing rails, and an area of the detachment preventing plate near the escaping holes covers openings of the nut accommodating holes of the terminal block to prevent detachment of the nuts. A mating terminal in the case is placed on the terminal fitting supported on the terminal block and the bolt inserted through the bolt insertion holes is threadedly engaged with the nut and tightened by a tool to connect the terminals. The detachment preventing plate ensures that the nuts are retained for a long time despite repeated thermal expansion and contraction of the housing to be attached to the terminal block, as compared to nuts that merely are press-fit.

A tool used to perform the above-described bolt fastening operation may contact a head of the bolt. Thus, the tip of a shaft of the bolt may apply an impulsive force to the nut. The terminal block is cantilevered from the front surface of the housing. Thus, an impulsive force applied to the nut may incline and deform the terminal block down toward the front together with the detachment preventing plate. The nut will incline with the terminal block so that an axial line of the nut may obliquely intersect with that of the bolt insertion hole of the terminal fitting so that the bolt cannot be tightened smoothly and, in an extreme case, it may not be possible to tighten the bolt.

Contrary to that, the fixed rails of the invention are formed at the opposite sides of each nut accommodating hole on the under surface of the terminal block and extend along the projecting direction of the terminal block. The fixed rails and the moving rails of the detachment preventing plate are engaged and function as reinforcements to prevent the terminal block from being inclining downward toward the front. Thus, the nuts are arranged in a proper posture and smooth tightening of the bolts is ensured.

According to the invention, the nuts will not detach from the nut accommodating holes and remain in a proper posture. Thus, the bolt tightening operation can be performed accurately and efficiently.

Tips of the shafts of the bolts may interfere with edges of the escaping holes and cause damage if the detachment preventing plate is attached while being displaced due to looseness between the rails. Accordingly, protrusions may be formed on sliding contact surfaces of either the fixed rails or the moving rails to prevent looseness. The protrusions are squeezed between the sliding contact surfaces of the fixed rails and the moving rails to fill up gaps. Thus, the detachment preventing plate is attached without looseness at a proper position where the escaping holes and the nut accommodating holes are aligned. As a result, the bolts are tightened while being allowed to escape without the tips of the shafts interfering with the escaping holes.

A resiliently deflectable lock piece may project on a front of the detachment preventing plate in an attaching direction and may engage a lock on the under surface of a base of the terminal block when the detachment preventing plate is pushed to a proper position. The detachment preventing plate is pushed along the fixing rails and displaces resiliently when the lock piece moves onto the lock to be resiliently displaced and, The lock piece returns and locks to the lock when the detachment preventing plate is pushed to the proper position.

A butting portion is provided lateral to the lock piece on the front edge of the detachment preventing plate. The butting portion contacts a stopper on the under surface of the terminal block before the tip of the lock piece butts against the housing and after the lock piece is locked to the lock, thereby preventing the detachment preventing plate from being pushed further. As a result, damage of the lock piece due to contact with the housing are prevented.

A reinforcing rib may be formed on a surface of the detachment preventing plate opposite the side with the moving rails and may extend in the attaching direction. The reinforcing rib ensures that a central part of the detachment preventing plate does not warp. Thus, sliding resistance between the rails is suppressed and the detachment preventing plate is attached easily. Further, the lock piece is unlikely to be disengaged from the lock portion.

The detachment preventing plate is formed with lids bulging to cover the respective escaping holes. The lids cover the tips of the shafts of the bolts that escape into the escaping holes and reliably provide insulation between the shafts of adjacent bolts. The lids also prevent entrance of external matter through the escaping holes and into the nut accommodating holes.

The invention reliably prevents detachment of nuts from nut accommodating holes after the nuts are arranged in a proper posture and enable a bolt fastening operation to be performed accurately and efficiently.

DETAILED DESCRIPTION

Figure 8:
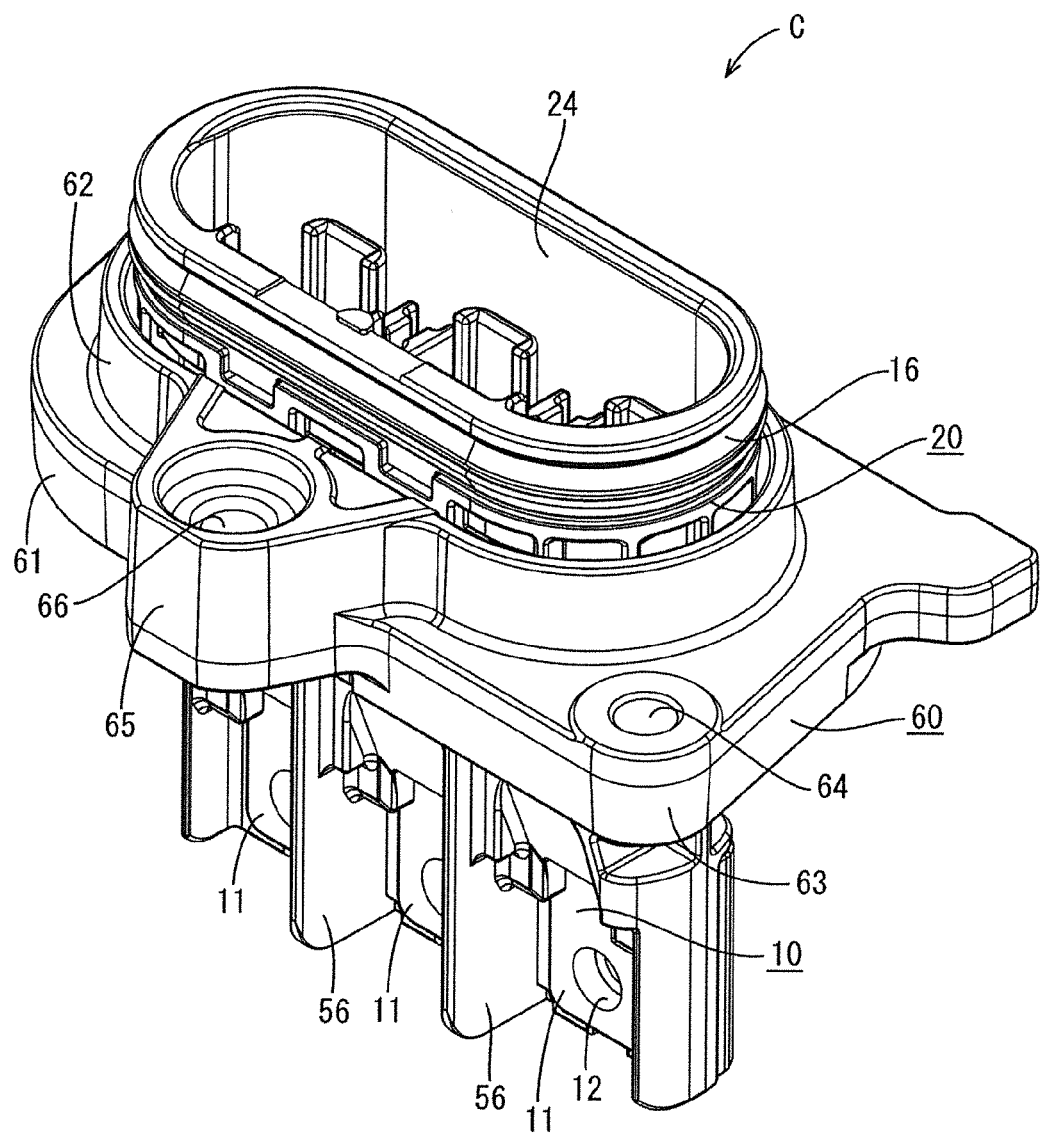
FIG. 8 is a perspective view when the connector is in a vertical posture.
Figure 9:
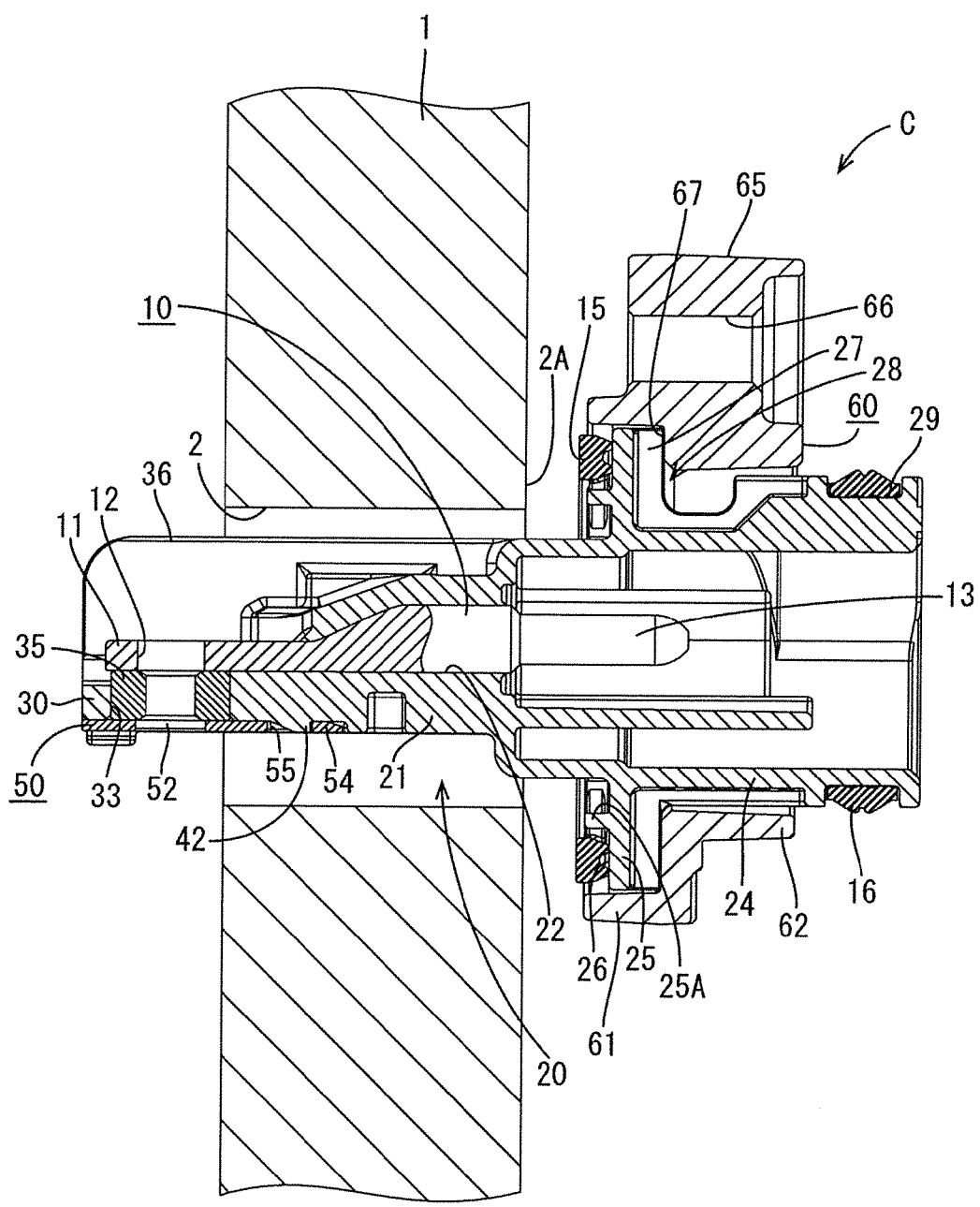
FIG. 9 is a section showing an operation of mounting the connector to a case.

A first embodiment of the invention is illustrated in FIGS. 1 to 10. A device connector C of this embodiment is applied to supply power to a device, such as a motor or an inverter mounted in a hybrid vehicle, an electric vehicle or the like. As shown in FIG. 9, the device connector C is mounted to a metal-made case 1 of the device and a mounting hole 2 having an elliptical front view is formed to penetrate through this case 1.

Figure 10:
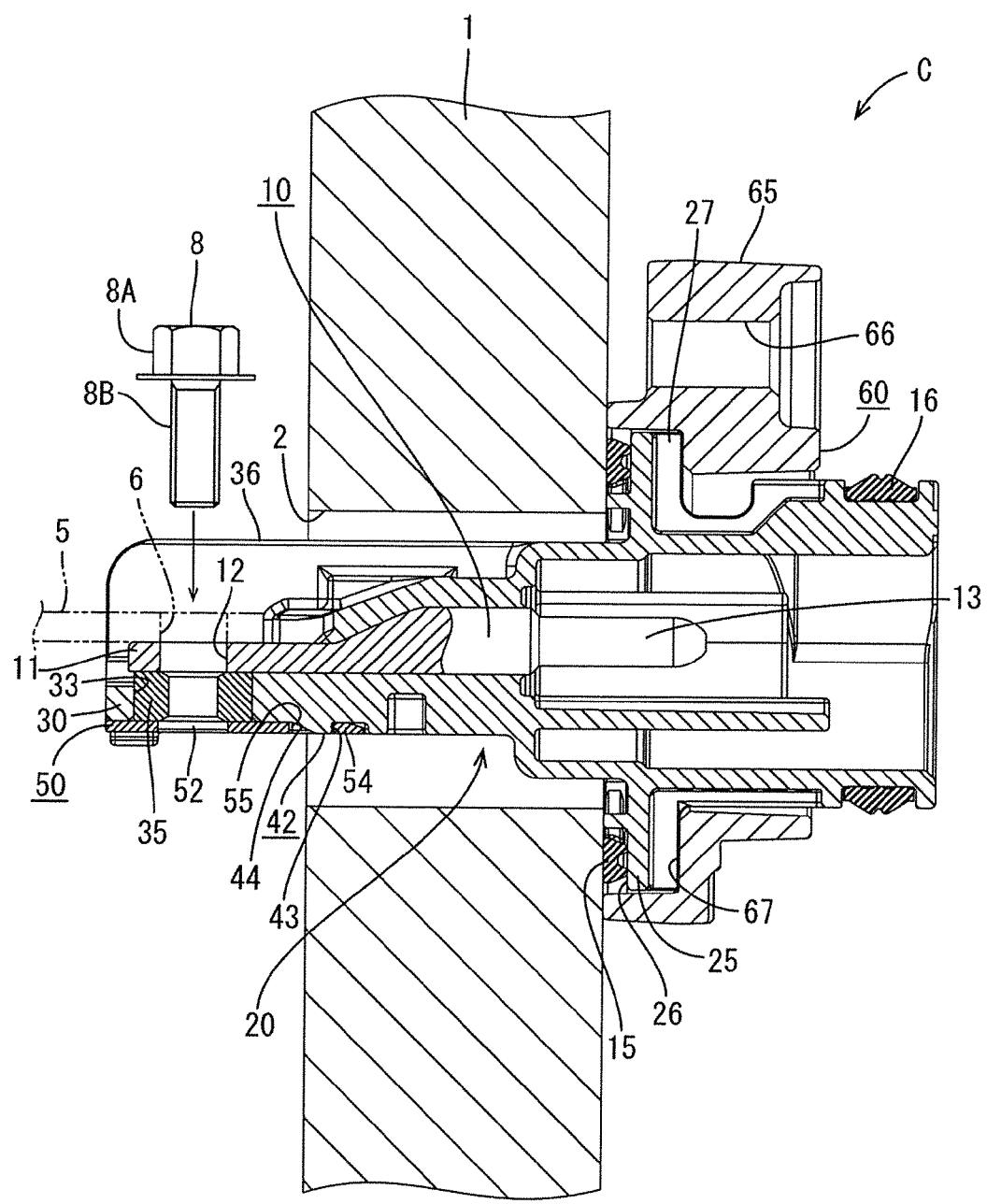
FIG. 10 is a section showing a state where the connector is mounted to the case.

The device connector C has terminal fittings 10 mounted in a housing 20 made of synthetic resin. As shown in FIG. 10, the housing 20 is mounted on an outer surface of the case 1, and tips of the terminal fittings 10 project into the case 1 through the mounting hole 2 while being supported on terminal blocks 30 projecting on the front of the housing 20. Mating terminals 5 in the case 1 are joined to the tips of the respective terminal fittings 10 by tightening bolts 8 and a wire-side connector (not shown) provided on an end of a harness is connected to the rear surface (right side of FIG. 10) of the housing 20.

In the following description of the device connector C, a vertical direction is based on FIG. 1 and sides of the terminal blocks 30 on which a detachment preventing plate 50 is attached are referred to as upper sides below. Thus, FIGS. 9 and 10 show a vertically inverted state.

The device connector C includes the housing 20, the terminal fittings 10, a metal bracket 60 for mounting the housing 20 to the case 1, nuts 35 arranged in the terminal blocks 30 and the detachment preventing plate 50 for preventing the detachment of the nuts 35.

As shown in FIG. 9, the terminal fitting 10 is a round pin terminal and a tip side (left side of FIG. 9) is squeezed to form a connecting portion 11 in the form of a flat plate. A bolt insertion hole 12 is open on the connecting portion 11. The terminal fittings 10 are juxtaposed at regular intervals and are incorporated integrally into the housing 20 by insert molding.

Figure 1:
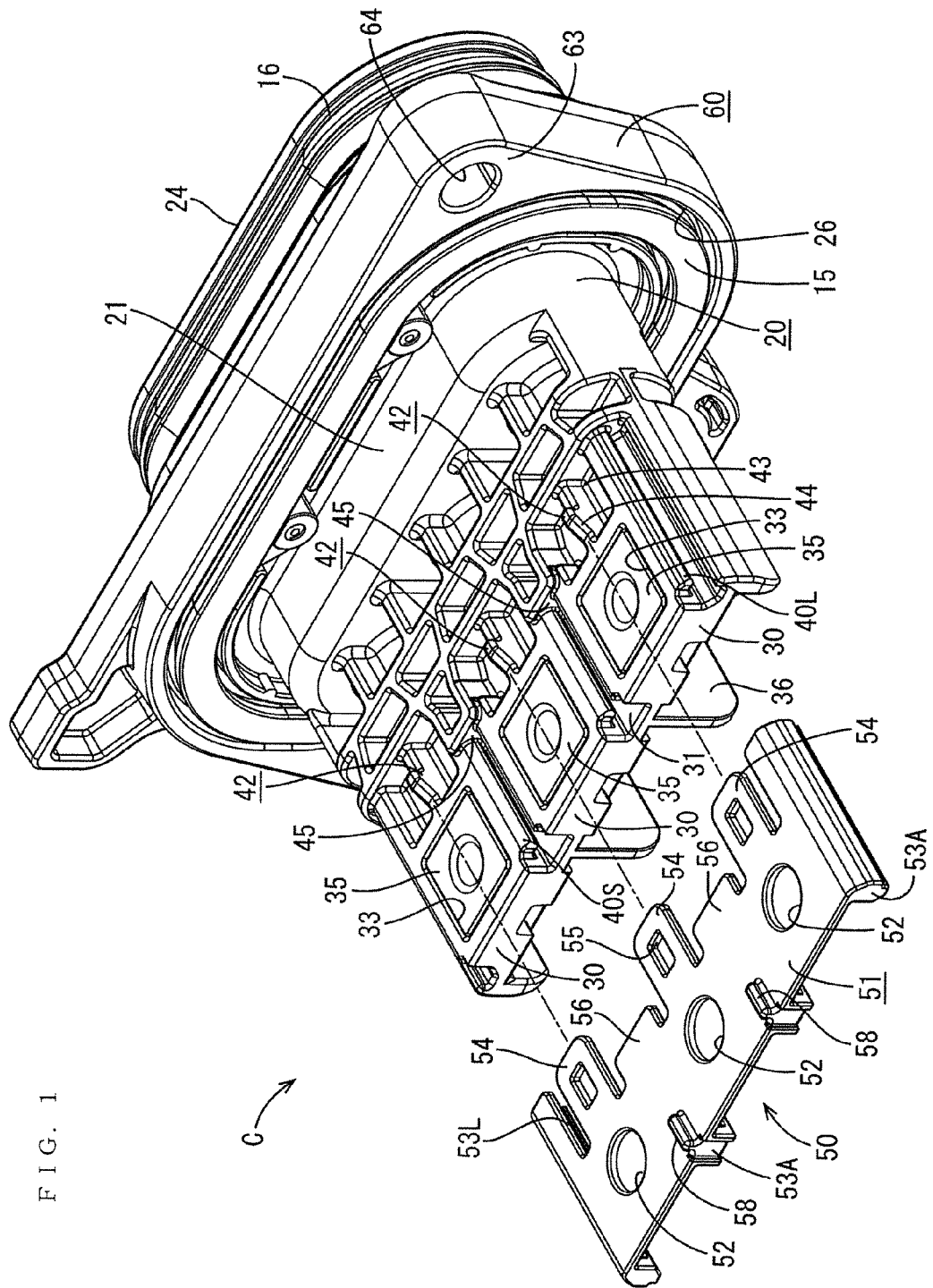
FIG. 1 is a perspective view showing an operation of attaching a detachment preventing plate of a connector according to a first embodiment of the invention.
Figure 2:
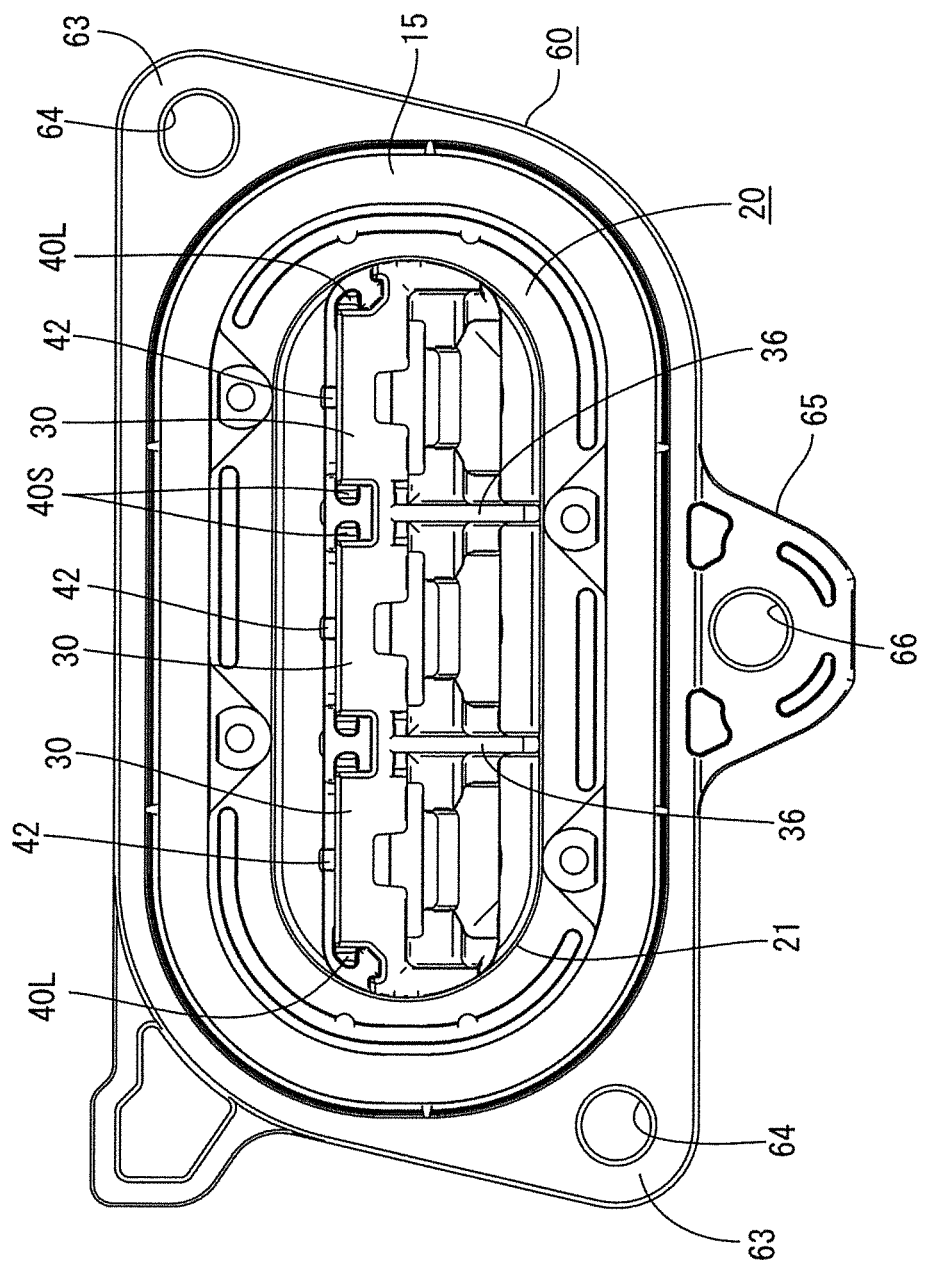
FIG. 2 is a front view of a housing.

As shown in FIGS. 1, 2 and 9, the housing 20 has a main body 21 with an elliptical cross-section, and terminal insertion holes 22 are formed side by side at regular intervals in the main body 21 for receiving lengthwise central parts of the respective terminal fittings 10.

A rearwardly open elliptical fitting tube 24 is open on the rear surface of the main body 21 and the wire-side connector is fittable therein. A specified length of a front part of the fitting tube 24 can fit into the mounting hole 2 of the case 1 with a predetermined clearance.

The terminal blocks 30 project forward from upper edge parts of the respective terminal insertion holes 22 on the front of the main body 21. Lower parts of the respective terminal blocks 30 are joined by a coupling plate 31.

As shown in FIG. 9, the three terminal fittings 10 are embedded in the housing 20 so that lengthwise central parts thereof are inserted in the terminal insertion holes 22, round pins 13 on rear ends project into the fitting tube 24 and the connecting portions 11 on front ends extend along the lower surfaces of the terminal blocks 30.

A flange 25 is formed over the entire periphery of the fitting tube 24 of the housing 20 near the main body 21. A forwardly projecting receiving portion 25A is formed over the entire periphery on a base part of the front surface of the flange 25, and an attaching portion 26 for an elliptical annular surface packing 15 is formed at an outer periphery of the receiving portion 25A. The surface packing 15 can contact an edge 2A on an outer surface side of the mounting hole 2 of the case 1.

Circumferentially spaced ribs 27 are formed on a rib arranging portion 28 on the rear surface of the flange 25 and have heights slightly larger than the thickness of the flange 25.

A ring mounting groove 29 is formed around the entire outer periphery of a rear end part of the fitting tube 24 and a seal ring 16 is mounted into the ring mounting groove 29. The seal ring 16 seals between the device connector C and a shield shell on the wire-side connector.

A nut accommodating hole 33 having a square front view is formed on each terminal block 30 coaxially with the bolt insertion hole 12 of the connecting portion 11 of the terminal fitting 10. The nut 35 can be accommodated with a small clearance in the nut accommodating hole 33. Partition walls 36 stand on the coupling plate 31 formed over the respective terminal blocks 30 and partition between adjacent terminal blocks 30 and adjacent terminal fittings 10.

As shown in FIG. 1, the detachment preventing plate 50 is attached on the upper surface sides of the terminal blocks 30 and collectively prevents detachment of all nuts 35 accommodated in the respective nut accommodating holes 33.

The detachment preventing plate 50 is made of synthetic resin and includes a wide main body plate 51 that can cover the nut accommodating holes 33 of all terminal blocks 30. Three side by side circular escaping holes 52 are formed in the main body plate 51 and are at the same intervals as the nut accommodating holes 33. Each escaping hole 52 allows the tip of a shaft 8B of the bolt 8 threadedly engaged with the nut 35 to escape.

Elongated fixed rails 40S, 40L protrude on opposite left and right sides of an upper surface of each terminal block 30, as shown in FIG. 2. As shown in FIG. 1, the four fixed rails 40S are in the center and extend from positions slightly retracted from the front edges of the terminal blocks 30 to positions slightly beyond the nut accommodating holes 33. On the other hand, the two fixed rails 40L are on opposite ends and extend from the positions slightly retracted from the front edges of the terminal blocks 30 to the front surface of the main body 21.

Figure 3:
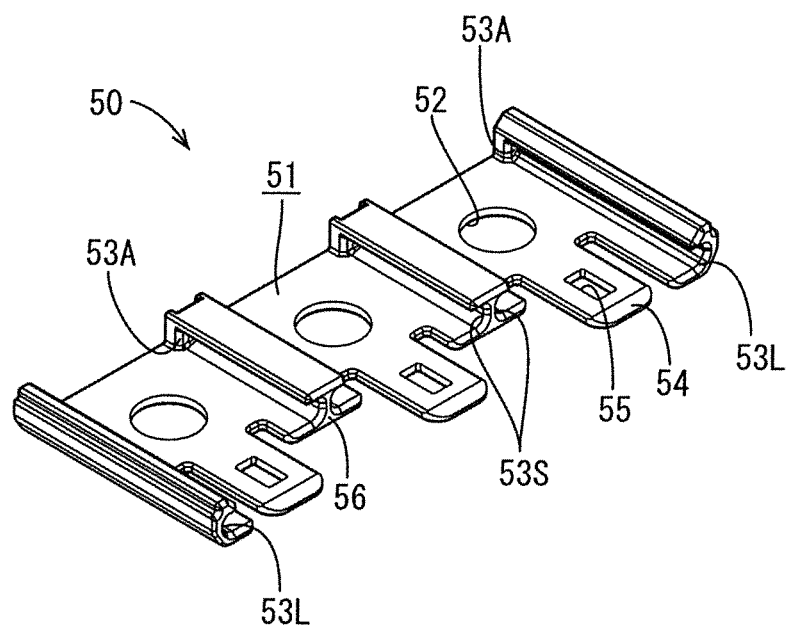
FIG. 3 is a perspective view of the detachment preventing plate.
Figure 4:
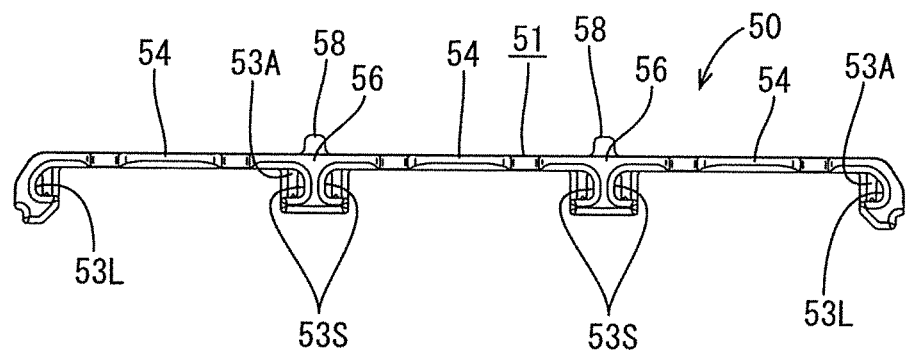
FIG. 4 is a front view of the detachment preventing plate.

On the other hand, two moving rails 53S, 53L are formed at opposite left and right sides of each escaping hole 52 on the lower surface of the detachment preventing plate 50, as shown in FIGS. 3 and 4. The moving rails 53S, 53L are grooves and have open surfaces facing the corresponding fixed rails 40 so as to fit slidably fitted to the corresponding fixed rails 40.

The four moving rails 53S in the center are short in conformity with the corresponding fixed rails 40S, whereas two moving rails 53L on opposite ends are long and extend forward in an attaching direction in conformity with the corresponding fixed rails 40L. Closing plates 53A are formed on rear ends of all the moving rails 53 in the attaching direction.

Resiliently displaceable lock pieces 54 project from the front edge of the main body 51 of the detachment preventing plate 50 at positions aligned with the escaping holes 52. A lock hole 55 is formed in each lock piece 54. On the other hand, as shown in FIGS. 1 and 9, a lock protrusion 42 is formed on the upper surface of each terminal block 30 at a position behind and corresponding to the nut accommodating hole 33 and can fit into the lock hole 55 of the lock piece 54 for locking. The rear surface of the lock protrusion 42 is an upright locking surface 43 and the front surface is upwardly inclined guide surface 44.

As shown in FIG. 1, the detachment preventing plate 50 is pushed toward the main body 21 of the housing 20 along the upper surfaces of the terminal blocks 30 from a state where the tips of the moving rails 53L on the opposite ends are fit to the fixed rails 40L on the opposite ends and the tip of each lock piece 54 is placed on the front edge of the terminal block 30. The detachment preventing plate 50 is guided by the fixed rails 40 and pushed from halfway through while the short moving rails 53S in the center are fit to the fixed rails 40S. In a final stage, the detachment preventing plate 50 is pushed while the lock pieces 54 are resiliently deformed and move onto the lock protrusions 42. When the detachment preventing plate 50 is pushed to a position where the closing plates 53A of the moving rails 53 contact entrances of the fixed rails 40, the lock holes 55 reach the lock protrusions 42. Thus, the lock pieces 54 resiliently return and the lock protrusions 42 fit into the lock holes 55 to retain the detachment preventing plate 50.

The lock protrusions 42 are formed immediately before the front surface of the main body 21 of the housing 20. Thus, the detachment preventing plate 50 may be pushed further even after the lock pieces 54 are locked to the lock protrusions 42, for example, due to dimensional tolerances of the rails 40, 53 and the tips of the lock pieces 54 may butt against the front surface of the main body 21 to be plastically deformed.

Thus, butting plates 56 are provided at two positions between the lock pieces 54 on the front of the main body 51 of the detachment preventing plate 50, and stoppers 45 are formed at two positions between the lock protrusions 42 on the upper surfaces of the terminal blocks 30 against which the butting plates 56 butt to prevent the detachment preventing plate 50 from being pushed farther. The butting plates 56 are set to butt against the stoppers 45 before the tips of the lock pieces 54 butt against the main body 21 of the housing 20 after the lock pieces 54 are locked to the lock protrusions 42.

Figure 5:
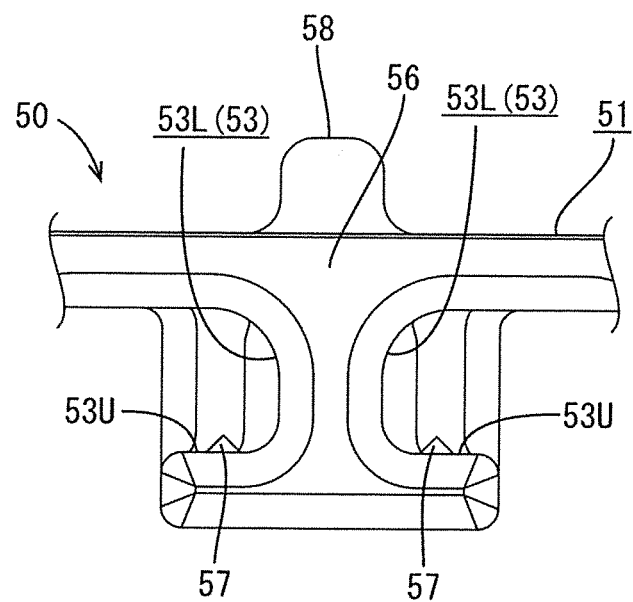
FIG. 5 is a partial enlarged view of FIG. 4.
Figure 6:
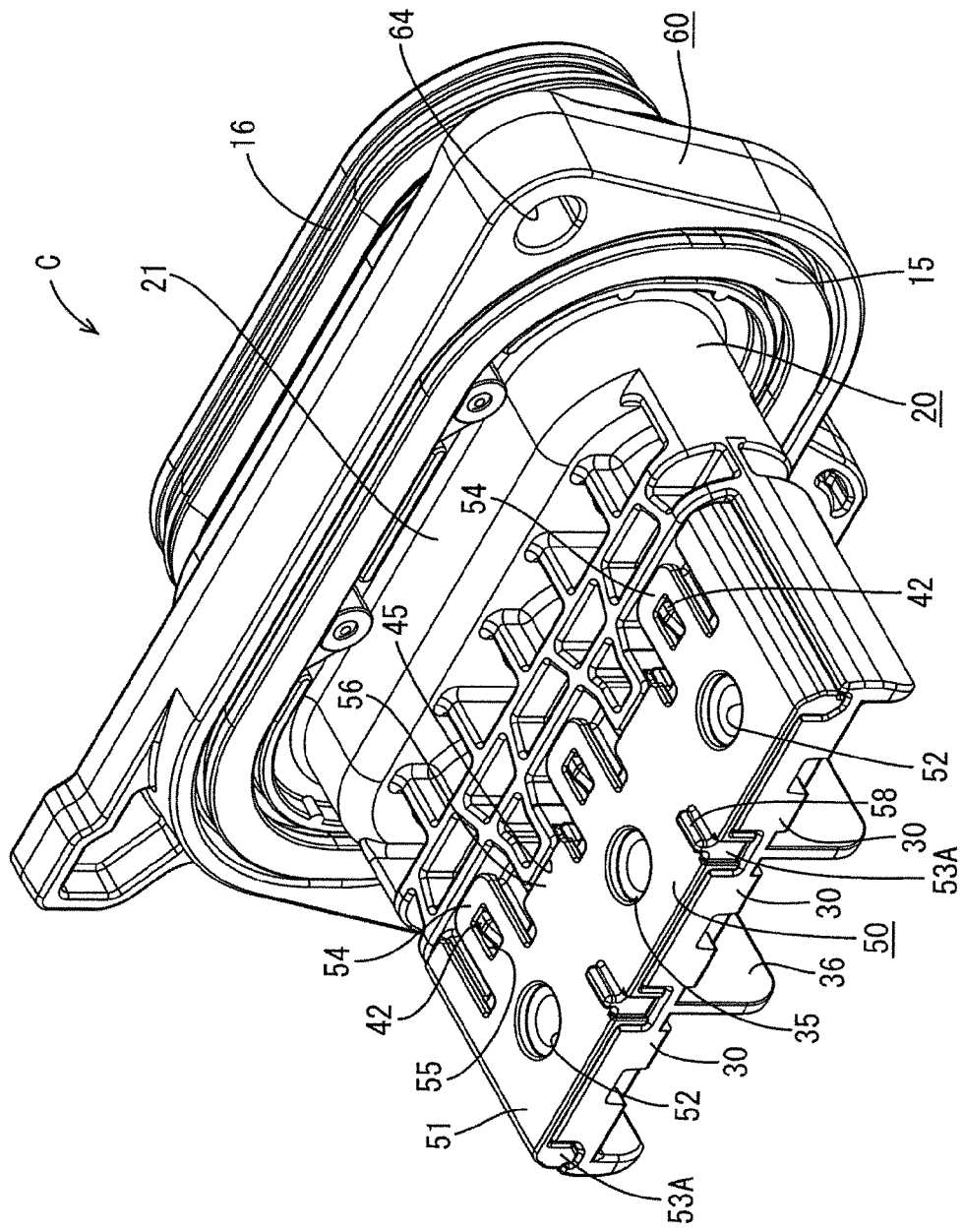
FIG. 6 is a perspective view of the connector in a state where the detachment preventing plate is attached.
Figure 7:
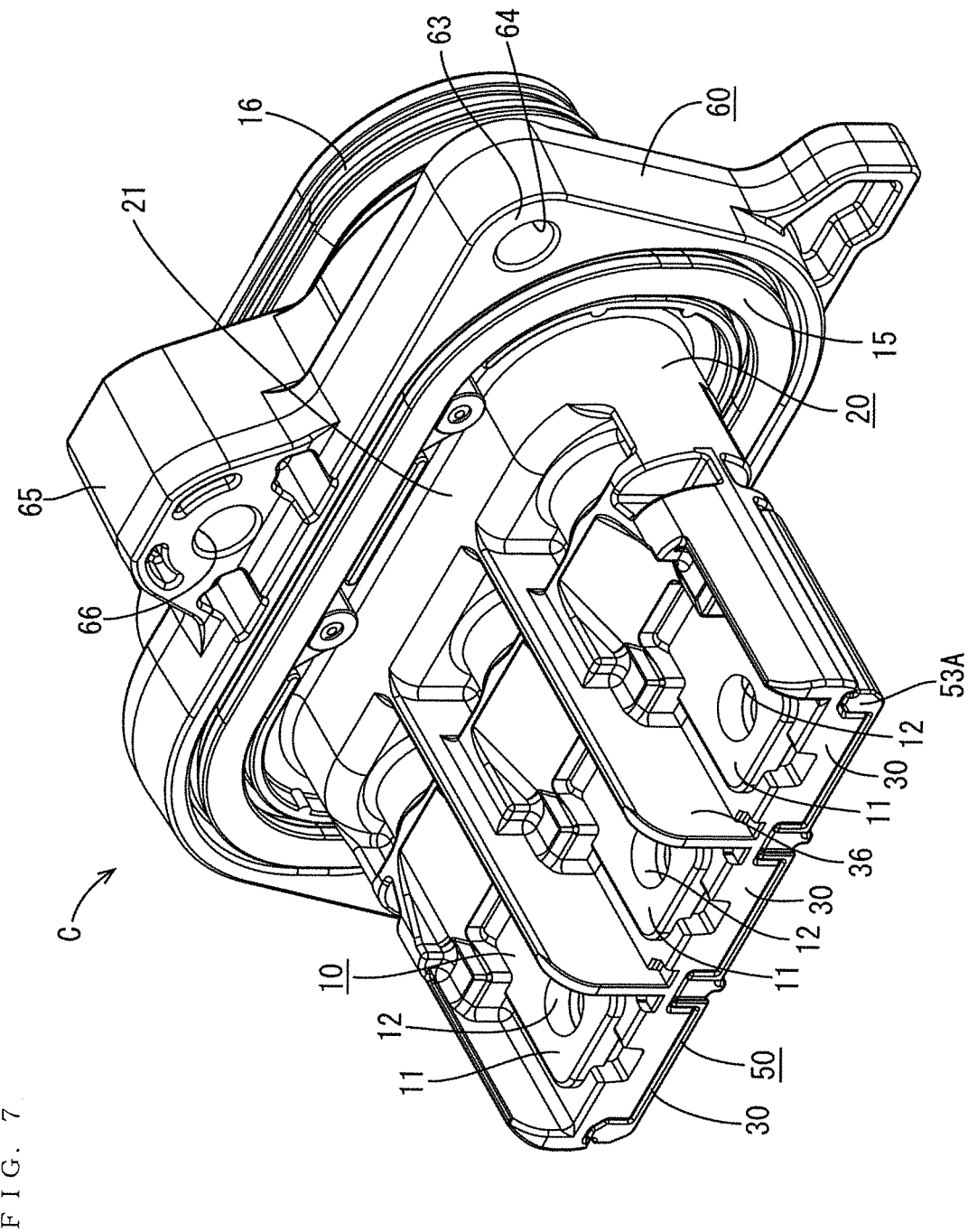
FIG. 7 is a perspective view of the connector in a vertically inverted state.

As shown in FIG. 5, a press-fit rib 57 is formed at a position near a back end on a lower groove surface 53U of each moving rail 53 of the detachment preventing plate 50 for preventing looseness.

As shown in FIG. 1, reinforcing ribs 58 extend in a front-back direction at two positions between the escaping holes 52 on a rear end part of the upper surface of the detachment preventing plate 50.

The bracket 60 is made of die cast aluminum and, as shown in FIGS. 8 and 9, defines a stepped elliptical tubular shape to cover the outer peripheral surface of an area of the housing 20 from the flange 25 to a position before the ring mounting groove 29. More specifically, the bracket 60 has a small diameter portion 62 to be fit tightly to the outer periphery of an area before the ring mounting groove 29 and a large diameter portion 61 to be fit tightly to the outer periphery of the flange 25, including the packing attaching portion 26 on the front surface and the rib arranging portion 28.

As shown in FIG. 2, mounting portions 63 protrude on upper-right and lower-left corner parts of the large diameter portion 61 of the bracket 60 in a front view, and each mounting portion 63 has an insertion hole 64 for a bolt (not shown) to attach the bracket 60 to the outer surface of the case 1.

A connecting portion 65 protrudes at a center of the lower edge of the bracket 60 and has a thickness from a position slightly retracted from the front surface of the large diameter portion 61 to the rear surface of the small diameter portion 62. This connecting portion 65 has a screw hole 66 that can threadedly engage a bolt (not shown) to fasten the connecting portion 65 to the shield shell (not shown) mounted on the wire-side connector.

To assemble the connector C, the housing 20 with the three terminal fittings 10 integrally incorporated therein is formed by insert molding. The nuts 35 then are accommodated in the nut accommodating holes 33 of the respective terminal blocks 30 in a rotation prevented manner, as shown in FIG. 1.

The detachment preventing plate 50 then is pushed along the upper surfaces of the terminal blocks 30 while the moving rails 53 slide along the fixed rails 40 and squeeze the press-fit ribs 57 in the final stage. The detachment preventing plate 50 is pushed to a predetermined position so that the lock holes 55 of the lock pieces 54 fit to the lock protrusions 42 to retain the detachment preventing plate 50. Thus, the main body 51 of the detachment preventing plate 50 covers all of the nut accommodating holes 33 and the escaping holes 52 are concentric with the respective nut accommodating holes 33.

The surface packing 15 is attached to the packing attaching portion 26 on the front of the flange 25 of the housing 20 and the seal ring 16 is mounted into the ring mounting groove 29 on the rear of the housing 20.

The bracket 60 then is fit externally from the rear until a step 67 on the inner periphery of the bracket 60 contacts the ribs 27 of the rib arranging portion 28 on the rear surface of the flange 25, as shown in FIG. 9. Thus, the assembly of the connector C is completed and the front surface of the surface packing 15 on the packing attaching portion 26 projects by a predetermined amount from the front surface of the large-diameter portion 61 of the bracket 60.

The assembled connector C is set in a vertically inverted posture, as shown in FIG. 9, and is inserted into the mounting hole 2 of the case 1 with the terminal blocks 30 in the lead. The connector C is inserted until the surface packing 15 contacts the edge 2A on the outside of the mounting hole 2. Bolts are inserted into the insertion holes 64 of the mounting portions 63 on the bracket 60, and threadedly engage screw holes at corresponding positions on the outer surface of the case 1 and tightened to fix the housing 20 via the bracket 60 while the surface packing 15 is compressed resiliently, as shown in FIG. 10. In this way, the terminal blocks 30 of the housing 20 project into the case 1 through the mounting hole 2 and the edge 2A of the mounting hole 2 of the case 1 is sealed by the surface packing 15.

After the connector C is mounted, the mating terminal 5 is placed on the connecting portion 11 of each terminal fitting 10 supported on the terminal block 30. The bolt 8 then is inserted into the bolt insertion holes 6, 12, engaged threadedly with the nut 35, and tightened by a tool such as a wrench, as shown in FIG. 10 in the case 1, to connect the terminals 5, 10 to each other.

On the other hand, the wire-side connector is fit in a sealed manner into the fitting tube 24 of the housing 20 and the shield shell of the wire-side connector is connected to the connecting portion 65 of the bracket 60 by bolt fastening. A rubber boot then is mounted on an end of the wire-side connector.

As described above, the detachment preventing plate 50 is provided separately as a detachment preventing means for the nuts 35 provided in the terminal blocks 30. Thus, a function of preventing the detachment of the nuts 35 from the nut accommodating holes 33 can be exhibited over a long term as compared with the case where the nuts 35 are press-fit.

A wrench may contact a head 8A of the bolt 8 when performing the bolt fastening operation, and the tip of the shaft 8B of the bolt 8 may apply an impulsive force to the nut 35 pressed by the detachment preventing plate 50. On the other hand, the terminal block 30 is cantilevered from the front of the main body 21 of the housing 20, and an impulsive force applied to the nut 35 may incline the terminal block 30 down toward the front to deform together with the detachment preventing plate 50. The nut 35 may incline with the deformed terminal block 30 and an axis of the nut 35 may obliquely intersect the bolt insertion hole 12 so that the bolt 8 cannot be tightened smoothly, if at all.

However, in this embodiment, the fixed rails 40 are formed at opposite sides of the nut accommodating hole 33 on the surface of each terminal block 30 and extend along the projecting direction of the terminal block 30. The fixed and moving rails 40 and 53 function as reinforcing members to prevent the terminal block 30 from being inclined and deformed down toward the front. Thus, the nut 35 is arranged in a proper posture free from inclination of the axial so that smooth tightening of the bolt 8 is ensured.

Detachment of the nut 35 is prevented reliably after the nut 35 is arranged in the proper posture and the bolt tightening operation can be performed accurately and efficiently.

The tips of the shafts 8B of the bolts 8 may interfere with edges of the escaping holes 52 during the bolt tightening if the detachment preventing plate 50 is displaced due to looseness between the rails 40, 53. However, the press-fit ribs 57 are squeezed between the sliding contact surfaces of the fixed and moving rails 40 and 53 to fill up gaps and prevent looseness. Thus, the escaping holes 52 and the nut accommodating holes 33 align, and tips of the shafts 8B of the bolts 8 will not interfere with edges of the escaping holes 52.

The butting plates 56 are provided laterally of the lock pieces 54 on the front edge of the detachment preventing plate 50 and contact the stoppers 45 on the terminal blocks 30 to stop the pushing of the detachment preventing plate 50 before the tips of the lock pieces 54 contact the main body 21 of the housing 20. Thus, the deformation, damage or the like of the lock pieces 54 due to contact with the main body 21 of the housing 20 are prevented.

The reinforcing ribs 58 are provided on the rear end of the surface of the detachment preventing plate 50, and prevent a central part of the detachment preventing plate 50 from being warped and deformed. Thus, the lock pieces 54 are unlikely to disengage inadvertently from the lock protrusions 42. Further, unnecessary sliding resistance between the rails 40 and 53 is suppressed and the attaching operation of the detachment preventing plate 50 is facilitated.

Figure 11:
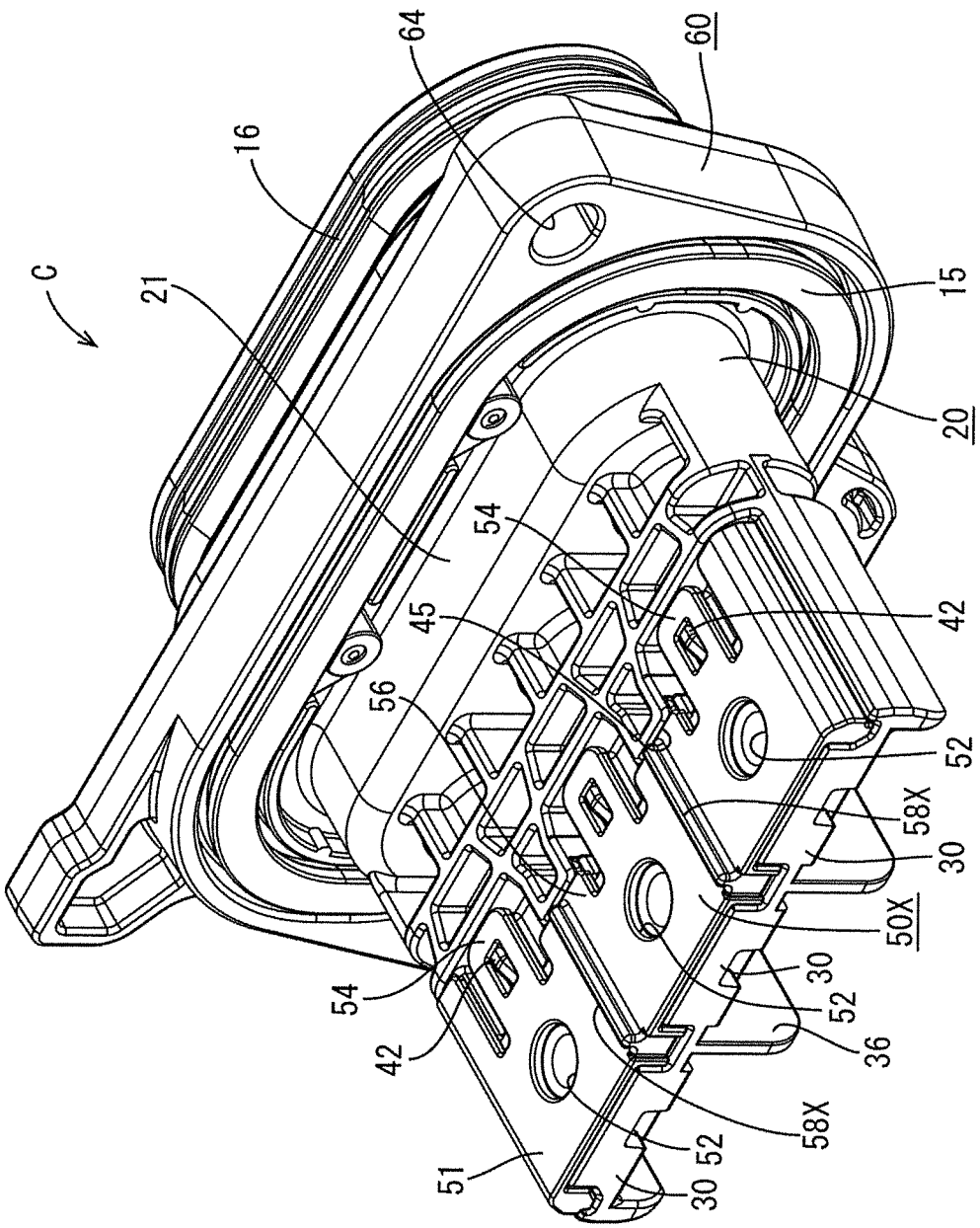
FIG. 11 is a perspective view of a connector in a state where a detachment preventing plate according to a second embodiment is attached.

FIG. 11 shows a second embodiment of the present invention. In this second embodiment, reinforcing ribs 58A formed at two positions between escaping holes 52 and in a length area from the rear edge of a main body plate 51 to the front edges of butting plates 56 on the upper surface of a detachment preventing plate 50X. The other structure is as in the above first embodiment. According to this second embodiment, warping deformation of the detachment preventing plate 50X to curve a central part thereof in the front-back direction is prevented more reliably. Further, the second embodiment also is effective in reinforcing the butting plates 56. Furthermore, the reinforcing ribs 58A partition between adjacent escaping holes 52 over the entire lengths to provide excellent insulation between the tips of shafts 8B of bolts 8 projecting from the adjacent escaping holes 52.

Figure 12:
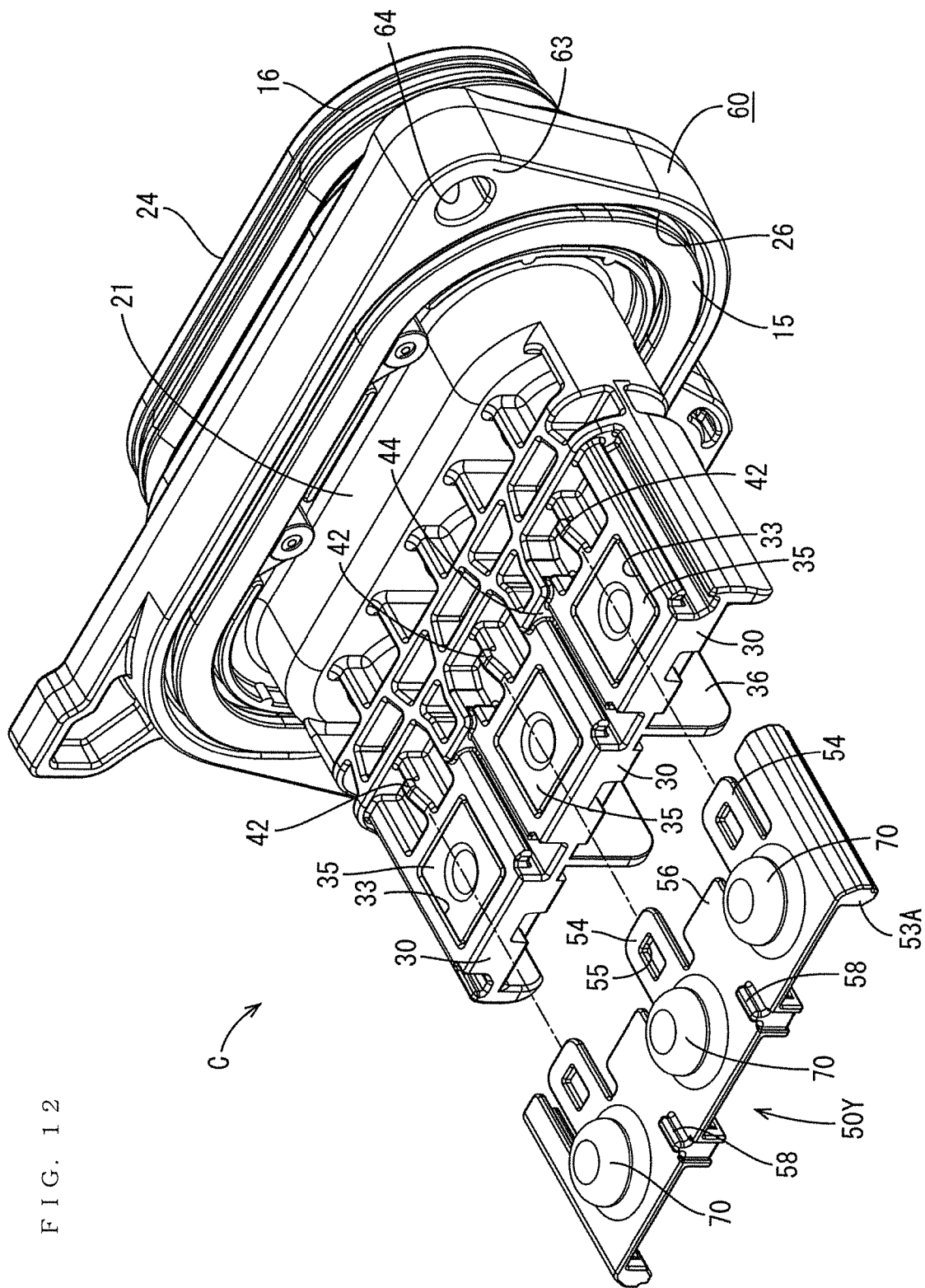
FIG. 12 is a perspective view showing an operation of attaching a detachment preventing plate of a connector according to a third embodiment.
Figure 13:
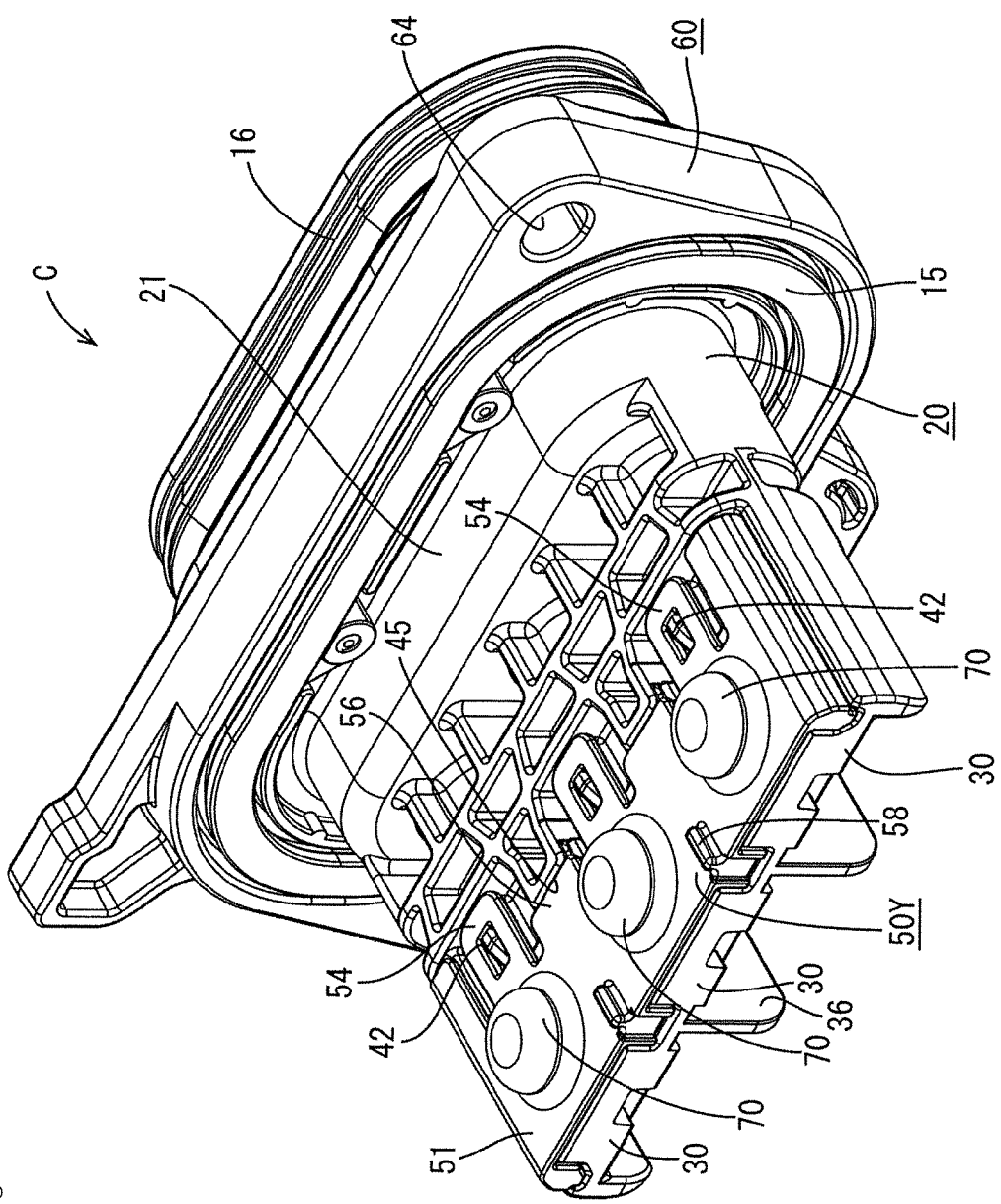
FIG. 13 is a perspective view of the connector in the state where the detachment preventing plate is attached.

A third embodiment of the invention is described with reference to FIGS. 12 and 13. Unlike the detachment preventing plate 50 of the first embodiment, dome shaped lids 70 cover escaping holes 52 on a detachment preventing plate 50Y. According to this embodiment, the lids 70 cover tips of shafts 8B that escape into the escaping holes 52 when bolts 8 are tightened. The lids 70 also provide insulation between the shafts 8B of the adjacent bolts 8 and prevent external matter from entering into nut accommodating holes 33 through the escaping holes 52. For example, a situation where adjacent bolts 8 are shorted due to the entrance of an external matter made of metal can be prevented.

The invention is not limited to the above described embodiments, and the following embodiments also are included in the scope of the invention.

More or fewer than three terminal blocks may be provided.

The positions of the tips of the terminal blocks need not align.

The butting portions that prevent the detachment preventing plate from being pushed any farther by contacting the stoppers of the terminal blocks may have other shapes, and may be projections projecting from the upper surface of the detachment preventing plate.

The press-fit ribs for preventing looseness are formed on the sliding contact surfaces of the moving rails on the detachment preventing plate in the above embodiment. However, they may be on the sliding contact surfaces of the fixed rails formed on the terminal blocks.

The detachment preventing plate of the third embodiment may also be so structured that reinforcing ribs are formed over the entire length as illustrated in the second embodiment.

The assembling procedure of the connector described above can vary.

The invention is applicable to a device connector in which a terminal fitting connected to an end of a wire is mounted directly in a housing.

LIST OF REFERENCE SIGNS

C . . . device connector
1 . . . case
2 . . . mounting hole
2A . . . hole edge
5 . . . mating terminal
6 . . . bolt insertion hole
8 . . . bolt
8A . . . head
8B . . . shaft
10 . . . terminal fitting
11 . . . connecting portion
12 . . . bolt insertion hole
20 . . . housing
21 . . . main body
30 . . . terminal block
33 . . . nut accommodating hole
35 . . . nut
40 . . . fixed rail
42 . . . lock protrusion
45 . . . stopper
50, 50X, 50Y . . . detachment preventing plate
51 . . . main body plate
52 . . . escaping hole
53 . . . moving rail
54 . . . lock piece
55 . . . lock hole
56 . . . butting plate
57 . . . press-fit rib
58, 58X . . . reinforcing rib
60 . . . bracket
70 . . . lid

What is claimed is:

1. A device connector, comprising:
a housing mountable on an outer surface of a case of a device;
a terminal block projecting from a front surface of the housing and projecting into an interior of the case as the housing is mounted on the case, nut accommodating holes formed in the terminal block and configured for accommodating nuts in a rotation prevented manner;
terminal fittings mounted side by side in the housing, each of the terminal fittings having a tip with a bolt insertion hole, the tips projecting from the front surface of the housing and being supported on the terminal block with the bolt insertion hole aligned with a respective one of the nuts, the terminal fitting being connectable to a mating terminal in the device by fastening a bolt;
a detachment preventing plate mounted on a surface of the terminal block to prevent detachment of the nuts and formed with escaping holes at positions corresponding to the respective nut accommodating holes for allowing ends of the bolts to escape;
fixed rails formed on the surface of the terminal block at opposite sides of each nut accommodating hole and extending in a projecting direction of the terminal block; and
moving rails provided on a surface of the detachment preventing plate and being slidably fit to the fixed rails,
wherein the detachment preventing plate is pushed to cover the surface of the terminal block from a projecting end of the terminal block while the moving rails are slid along and guided by the fixed rails.

2. The device connector of claim 1, further comprising a reinforcing rib formed on the detachment preventing plate near a rear end of the detachment preventing plate in the attaching direction and on a surface of the detachment preventing plate opposite to the surface with the moving rails.

3. The device connector of claim 1, further comprising lids projecting from the detachment preventing plate to cover the respective escaping holes.

4. The device connector of claim 1, wherein protrusions for preventing looseness are formed on sliding contact surfaces of either the fixed rails or the moving rails.

5. The device connector of claim 4, further comprising a resiliently displaceable lock piece projecting on a front edge of the detachment preventing plate in an attaching direction, the lock piece being fit to and retaining a lock provided on the surface of the terminal block when the detachment preventing plate is pushed to a proper position.

6. The device connector of claim 5, further comprising a butting portion formed on the detachment preventing plate laterally of the lock piece, and a stopper provided on the terminal block, the butting portion and the stopper engaging to prevent further movement of the detachment preventing plate before the end of the lock piece butts against the housing and after the lock piece is locked to the lock.

* * * * *